United States Patent
Gris

Patent Number: 5,275,729
Date of Patent: Jan. 4, 1994

[54] PLEATED LIQUID FILTER HAVING ZONES OF DIFFERENT FILTRATION

[75] Inventor: Christian Gris, Saint Claude de Diray, France

[73] Assignee: Lucas Industries public limited company, West Midlands, England

[21] Appl. No.: 889,794

[22] Filed: May 28, 1992

[30] Foreign Application Priority Data

Jun. 4, 1991 [FR] France ............... 91 06726

[51] Int. Cl.⁵ ............................... B01D 27/06
[52] U.S. Cl. ..................... 210/472; 210/493.5; 210/497.2; 55/500; 55/521
[58] Field of Search ............ 209/189; 210/493.1, 210/493.4, 493.5, 497.01, 497.1, 497.2, 472; 55/500, 521, 486

[56] References Cited

U.S. PATENT DOCUMENTS

| | | |
|---|---|---|
| 4,038,194 | 7/1977 | Luceyk et al. |
| 4,303,530 | 12/1981 | Shah et al. |
| 4,555,342 | 11/1985 | Grant ............... 210/493.4 |
| 4,734,195 | 3/1988 | Lhuillier et al. ........... 210/493.1 |
| 4,744,902 | 5/1988 | Taki et al. ............... 210/493.5 |
| 4,824,564 | 4/1989 | Edwards et al. .......... 210/493.4 |
| 4,877,526 | 10/1989 | Johnson et al. .......... 210/497.01 |
| 4,925,561 | 5/1990 | Ishii et al. ............... 210/493.5 |
| 5,071,555 | 12/1991 | Enbom ................ 210/493.5 |
| 5,147,541 | 9/1992 | McDermott, Jr. ........ 210/493.4 |

FOREIGN PATENT DOCUMENTS

| | | |
|---|---|---|
| 2267817 | 11/1975 | France. |
| 2407013 | 5/1979 | France. |
| 668705 | 3/1952 | United Kingdom ........... 210/493.4 |

Primary Examiner—Robert A. Dawson
Assistant Examiner—W. L. Walker
Attorney, Agent, or Firm—Trexler, Bushnell, Giangiorgi & Blackstone, Ltd.

[57] ABSTRACT

A filter element incorporates a filter medium formed in one example by two strips of paper which are rolled about a center tube so that the medium in section, has a zig-zag configuration. Apertures are provided to allow the passage of air from the pockets defined by the paper.

5 Claims, 1 Drawing Sheet

PLEATED LIQUID FILTER HAVING ZONES OF DIFFERENT FILTRATION

This invention relates to a filter for a liquid more particularly liquid fuel, and of the kind which is intended to be located between a reservoir and the inlet of a pump, the filter incorporating a filtering medium which acts during operation of the pump to retain particulates suspended in the liquid.

The filter has an inlet which is connected to the reservoir and an outlet which is connected to the inlet of the pump and in operation the pressure at the filter outlet will be lower than that at the filter inlet by the amount of the pressure drop across the filtering medium. The pressure drop which occurs depends upon a number of factors such as the nature of the liquid, its viscosity and flow rate and the pore size of the filtering medium. The liquid which is contained within the reservoir may be aerated and as the liquid is drawn through the filter medium the air will tend to be trapped by the filter medium. Air pockets will form and will eventually pass through the filter medium. In the case of a fuel filter for an engine fuel system there is the possibility that the sudden release of the air to the pump will result in an interruption in the flow of fuel to the engine leading to engine starting and running difficulties.

Figure 1:
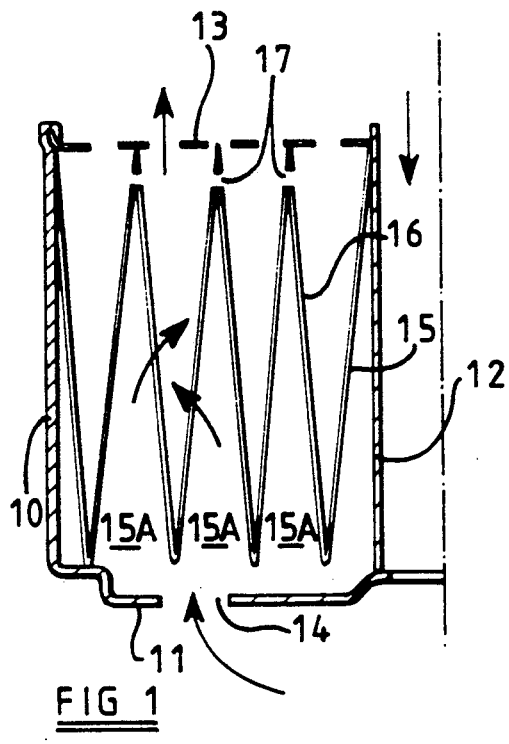
FIG. 1 is a sectional side elevation through part of a filter element incorporating the invention.

With reference to FIG. 1 of the drawings the filter element comprises an outer sheet metal casing of cup shaped form and having a side wall 10 and a base wall 11. Extending axially within the casing is a centre tube 12 this being location at its lower end upon an apertured raised portion of the base wall and at its upper end by a location defined in an apertured closure plate 13. The outer peripheral edge of the closure plate is rolled over the edge of the side wall 10. The base wall 11 is provided with flow apertures 14 and although not shown in the construction of the apertures 14 the metal removed to form the apertures is arranged to form a support for the filter medium of the element.

The filter medium which is located in the space defined between the internal surface of the side wall 10 and the outer surface of the centre tube 12 comprises in the example of FIG. 1 two sheets 15, 16 of filter paper which are wound about the centre tube. In the example the sheets are wound four times about the tube but in practice there will be more turns. During the winding process adhesive is applied to say the strip 15, on one side of the paper adjacent one longitudinal edge and to the other side of the paper adjacent the other longitudinal edge. As the strips are wound together the adhesive secures the strips together so that in section and as seen in FIG. 1 the strips adopt a zig zag configuration defining a series of pockets 15A. In the use of the filter element it is mounted so that its upper end fits into a mounting and its lower end is engaged by an end closure. The mounting and the end closure define passages so that the liquid to be filtered flows down the centre tube 12 through the apertures 14 and then into the pockets and housing the strips of filter paper and out through the holes in the plate 13. The flow of liquid is indicated by the arrows. Contaminant in the liquid is trapped on the surface of and in the filter paper.

The liquid in particular if the liquid in fuel for compression ignition engine will contain air which since the filter paper is "wetted" by the fuel will tend to be trapped on the upstream side of the paper. As the air collects it will tend to form air pockets which will locate at the upper ends of the pockets formed by the strips of paper. Eventually the pockets of air will be drawn through the paper and as described, may influence the operation of the engine. The pump will have an air venting system but this system may not be able to deal with substantial quantities of air drawn into the pump but will be able to deal with small quantities of air contained in the fuel.

In order to prevent the accumulation of large quantities of air into the filter it is proposed to provide zones in the filter element which will allow the passage of air between the upstream and downstream sides of the filter medium.

In the example of FIG. 1 the aforesaid zones are formed by a series of small holes 17 along the length of the strips 15, 16, the holes being positioned adjacent the upper ends of the pockets formed by the strips.

In a particular example the roll of filter medium has inside and outside diameters of 20 mm and 70 mm respectively and a height of 60 mm. Such a filter has a fuel filtering capacity of between 40 and 50 liters/hour and the holes 17 are able to allow an air flow of about 500 cm$^3$/hour.

Figure 2:
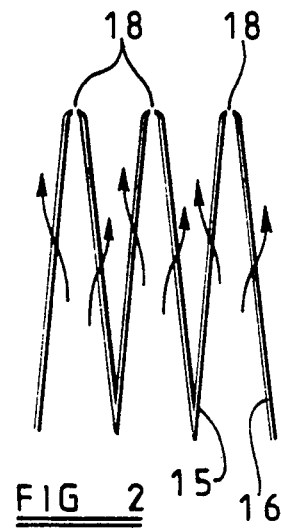
FIG. 2 is a view showing a modification to the filter medium shown in FIG. 1.

The element which is shown in FIG. 2 is substantially the same as the element shown in FIG. 1 except that the holes 18 are formed along joint line between the strips of filter paper.

Figure 3:
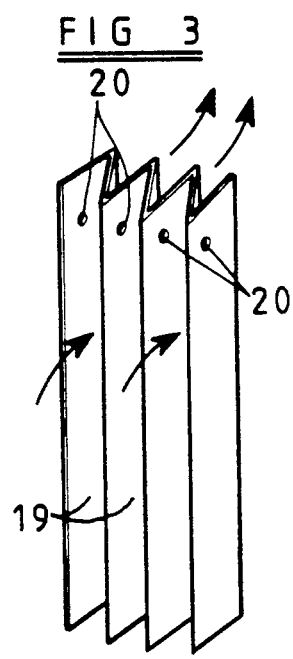
FIGS. 3 and 4 show in perspective, the filter medium of two other forms of filter element.

The filter element which incorporates the filter medium shown in FIG. 3 comprises a perforated centre tube not shown, about which the filter medium is wrapped. Around the filter medium is a perforated cover and the assembly is completed by a pair of end caps which are glued to the opposite ends of the filter medium. The filter medium itself comprises a length of filter material which is folded transversely of its length to form a series of pockets 19 into which the liquid to be filtered is directed as indicated by the arrows. The filter element is mounted with its axis substantially vertical so that any air will collect at the upper ends of the pockets. Holes 20 in the folded portions of the medium allow the air to escape to the down stream side of the filter element.

Figure 4:
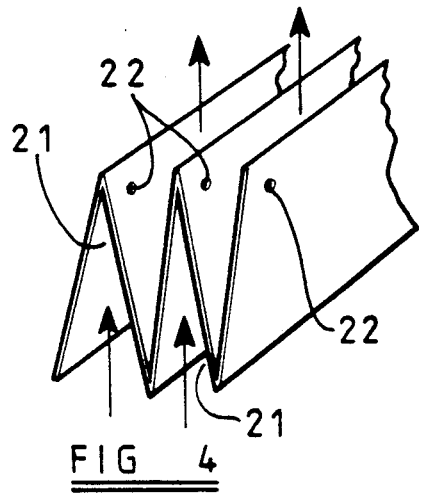

The filter element which incorporates the filter medium seen in FIG. 4 is a flat type of filter and the assembly will include sides which extend around the four sides of the filter medium. The medium is folded as in the example of FIG. 3 and the end edges and side edges sealed to the aforesaid sides of the assembly. The filter element is intended to be mounted horizontally with the liquid flow being as indicated by the arrows. Pockets 21 are formed as a result of folding the medium and the folded portions of the medium are provided with holes 22 to allow the air to escape to the downstream side of the filter element.

Figure 5:
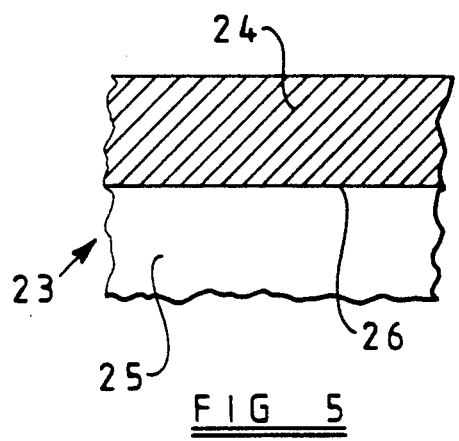
FIG. 5 is a side view of a portion of filter paper as modified in accordance with the invention.

In FIG. 5 there is illustrated part of a strip 23 of filter paper which can be incorporated into the element construction described in the earlier figures. The strip 23 has an upper treated zone 24 and a lower untreated zone 25. The untreated zone 25 provides for the filtration of the liquid and the treated zone 24 provides for the passage of air to the downstream side of the filler element. The treated zone 24 may be formed by providing tiny holes or otherwise by modifying the paper to facilitate the passage of air. Mechanical, electrical, hydraulic or chemical means may be used to modify the paper. As an alternative the treated zone 24 may be formed from paper having a different filtration characteristic to the paper forming the untreated zone 25. In this case the edges of the lengths of paper are secured together along a glue line 26.

I claim:

1. A liquid filter element which includes a filter medium constructed to form a series of pockets into which in use the liquid to be filtered is directed, each pocket formed between a pair of spaced sidewalls, each sidewall being formed from a single thickness of filter medium, the filter medium having the required filtration characteristic for the liquid to be filtered, the filter medium including a plurality of zones respectively formed in both of said sidewalls, which present a different filtration characteristic and allow the passage of air through the filter medium from said pockets.

2. A liquid filter element which includes a filter medium constructed to form a series of pockets into which in use the liquid to be filtered is directed, each pocket formed between a pair of spaced sidewalls, each sidewall being formed from a single thickness of filter medium, the filter medium having required filtration characteristic for the liquid to be filtered, the filter medium including zones which present a different filtration characteristic and allow the passage of air through the filter medium from said pockets, through apertures in the filter medium.

3. A liquid filter element which includes a filter medium constructed to form a series of pockets into which in use the liquid to be filtered is directed, each pocket formed between a pair of spaced sidewalls, each sidewall being formed from a single thickness of filter medium, the filter medium having required filtration characteristic for the liquid to be filtered, the filter medium including zones which present a different filtration characteristic and allow the passage of air through the filter medium from said pockets, and the filter medium is composed of at least two strips of filter paper secured together along adjacent edges to form a pocket, the strips of paper being through apertured at or adjacent said adjacent edges.

4. A liquid filter element which includes a filter medium constructed to form a series of pockets into which in use the liquid to be filtered is directed, each pocket formed between a pair of spaced sidewalls, each sidewall being formed from a single thickness of filter medium, the filter medium having required filtration characteristic for the liquid to be filtered, the filter medium including zones which present a different filtration characteristic and allow the passage of air through the filter medium from said pocket, and the filter medium comprises a strip of paper which defines a treated zone and an untreated zone, said treated zone allowing for the passage of air.

5. A filter element according to claim 4, in which the strip of paper is formed by two lengths of paper which are secured together along a glue line.

* * * * *